Patented Jan. 1, 1929.

1,697,275

UNITED STATES PATENT OFFICE.

HAROLD GRAY, OF AKRON, OHIO, ASSIGNOR TO THE B. F. GOODRICH COMPANY, OF NEW YORK, N. Y., A CORPORATION OF NEW YORK.

COMPOSITE PRODUCT AND METHOD OF MAKING SAME.

No Drawing.   Application filed April 27, 1927.   Serial No. 187,111.

This invention relates to composite products and more particularly to integral constructions built up from a plurality of pieces or sections, and it has for an object to provide a practical method for the manufacture of such constructions and further to provide commercial products so constructed.

The present invention is based upon the discovery that turpentine when acted upon by certain reagents becomes thickened, particularly under the influence of heat, and in this thickened condition possesses excellent bonding properties, these properties being especially good for bonding metals to rubber.

In a preferred embodiment of carrying out my invention, turpentine is treated with a strong inorganic non-oxidizing acid, or a compound which is capable of undergoing thermal or hydrolytic dissociation to give such an acid, for example, such acids and compounds as hydrochloric acid, hydrobromic acid, sulfuric acid, phosphoric acid, cupric chloride, mercuric chloride, aluminum chloride, antimony trichloride, phosphorus trichloride, phosphorus oxychloride, sulfur chloride, benzo trichloride, trichloracetic acid, antimony tribromide, ferrous bromide, cupric bromide, cupric iodide, stannous sulfate, ferrous sulfate, aluminum sulfate, and the like. This treatment may consist of admixing the reagent into turpentine and permitting the admixture to stand for a sufficient period to effect a reaction between the two, or the admixture may be subjected to heat to facilitate a reaction. Experiment has shown that heating the admixture on a steam bath for 24 hours effects a satisfactory reaction of the admixture with any of the above named reagents.

Briefly in carrying out the invention, the surfaces of the materials to be built into the composite product are prepared for joining, as by shaping, cleansing, etc., and coated with this turpentine reaction product. The parts are then assembled and held in pressure contact until the bonding films have set. It is generally desirable to subject the built-up construction to pressure for a considerable period, and where the nature of the material permits it, it is also desirable to subject the construction to heat in order to facilitate the setting and to augment the adhesive characteristics of the bonding film.

The following specific examples are given by way of illustration:

*Example 1.*—Into 100 parts by weight of turpentine 50 parts of stannous sulfate were added and the admixture heated for 24 hours at 110° C. The reaction product thus prepared was painted on a clean surface of a steel plate and a coarse-woven fabric frictioned with a vulcanizable rubber composition was superposed upon the coated metal, the assembled structure being subjected to vulcanizing temperatures under pressure. The composite construction when submitted to test upon a Cooey machine showed a friction pull of 14 pounds per inch. This is approximately seven to ten times the bonding strength obtainable with the best rubber cements when employed in a similar construction.

*Example 2.*—As a further example, 50 parts by weight of trichloracetic acid were admixed by stirring into 100 parts of turpentine and the admixture heated for 24 hours upon a steam bath. The reaction mixture was spread in a film over a clean surface of a metal plate and a friction fabric cured thereto in the manner of the preceding example. The composite construction showed upon test a friction pull of 11 pounds per inch.

It will be understood that similar results may be obtained with the other reagents of the class hereinabove outlined and for this reason further specific examples of this character are deemed to be unnecessary.

*Example 3.*—Reaction products of turpentine and sulfur chloride, even when the reaction is carried out at sub-normal temperatures, exhibit remarkable adhesive properties in constructions similar to those above described. Thus, 50 parts by weight of sulfur chloride were mixed by stirring into 100 parts of turpentine at room temperature and the admixture then placed in an ice-box for 24 hours. The reaction product was then employed in the construction of a steel fabric product of the character above described. The resulting product disclosed on test a friction pull of 8 pounds per inch. In another experiment in which the reaction between the sulfur chloride and turpentine was facilitated by a slightly elevated temperature, the composite construction showed a friction pull of 13 pounds per inch. These experiments indicate that while heat is not necessary to the reaction of turpentine with these reagents, it nevertheless facilitates such reaction and probably imparts thereto improved bonding properties.

*Example 4.*—In another experiment, 50 parts by weight of sulfur chloride were dissolved in 200 parts of benzol and were then added to 100 parts of turpentine. The benzol was removed by evaporation and the mixture heated for 24 hours at 110° C. A composite construction of steel and rubberized fabric, built in the manner hereinabove described, disclosed a friction pull of 10 pounds per inch. A similar result is obtained by dissolving 100 parts of sulfur chloride in 500 parts of benzol and adding it to 100 parts of turpentine dissolved in 500 parts of benzol and refluxing the admixture for 24 hours.

It will be noted from the last two examples hereinabove given that the reaction between the turpentine and the reagents of the class of reagents hereinabove described may be effected under varying conditions of temperature, and either as diluted mixtures, or in solution, the resulting composite construction in any case possessing unusual strength. The composite constructions as hereinabove described have further been found to be extremely durable and to be unaffected by climatic conditions, water, weak acids or alkalies, and by reason of these very desirable properties a commercial product of great value may be constructed in accordance with the processes of this application.

While the above specification has been necessarily limited to a few selected examples, it is to be understood that various modifications in the processes hereinabove described may be employed and solid materials of all kinds may be built into composite constructions of the type herein indicated without departing from the principles of this invention.

I claim:

1. The method of producing composite products which comprises coating the surfaces to be united with a film of a reaction product of turpentine and a substance selected from a group comprising strong inorganic non-oxidizing acids and compounds capable of undergoing thermal or hydrolytic dissociation to give such acids, superposing the materials one upon the other with the coated surfaces in contact and subjecting the assemblage to pressure.

2. The method of producing composite products which comprises coating a surface of a metal with a film of the reaction product of turpentine and a substance selected from a group comprising strong inorganic non-oxidizing acids and compounds capable of undergoing thermal or hydrolytic dissociation to give such acids, superposing on the coated metal a rubber composition, and subjecting the assemblage under pressure to elevated temperatures.

3. The method of bonding rubber and metal which comprises coating the surface to be bonded to one of the materials with a composition comprising the reaction product of turpentine and a substance selected from a group comprising strong inorganic non-oxidizing acids and compounds capable of undergoing thermal or hydrolytic dissociation to give such acids, juxtaposing the rubber and metal with the surfaces to be bonded in contact, and subjecting the assembled product to heat and pressure.

4. The method of bonding bodies of rubber and metal which comprises coating the surface to be bonded of at least one of said bodies with a composition comprising the reaction product of turpentine and a substance selected from the group comprising hydrochloric acid, hydrobromic acid, sulfuric acid, phosphoric acid, cupric chloride, mercuric chloride, aluminum chloride, antimony trichloride, phosphorus trichloride, phosphorus oxychloride, sulfur chloride, benzo trichloride, trichloracetic acid, antimony tribromide, ferrous bromide, cupric bromide, cupric iodide, stannous sulfate, ferrous sulfate, aluminum sulfate, and the like, juxtaposing the bodies to bring the surfaces to be bonded in contact, and vulcanizing the rubber under pressure contact with the metal.

5. A composite construction including a vulcanized rubber composition and a ferrous metal bonded during vulcanization of the rubber composition through the intermediary of a composition comprising the reaction product of turpentine and a substance selected from a group comprising strong inorganic non-oxidizing acids and compounds capable of undergoing thermal or hydrolytic dissociation to give such acids.

6. A composite construction comprising rubber and metal integrally united together through the intermediary of a composition comprising the reaction product of turpentine and a substance selected from a group comprising hydrochloric acid, hydrobromic acid, sulfuric acid, phosphoric acid, cupric chloride, mercuric chloride, aluminum chloride, antimony trichloride, phosphorous trichloride, phosphorus oxychloride, sulfur chloride, benzo trichloride, trichloracetic acid, antimony tribromide, ferrous bromide, cupric bromide, cupric iodide, stannous sulfate, ferrous sulfate, aluminum sulfate, and the like.

7. A composite construction including two bodies of material integrally united through the intermediary of a composition comprising the reaction product of turpentine and a substance selected from a group comprising strong inorganic non-oxidizing acids and compounds capable of undergoing thermal or hydrolytic dissociation to give such acids.

In witness whereof I have hereunto set my hand this 20th day of April, 1927.

HAROLD GRAY.